United States Patent [19]

Aoki et al.

[11] Patent Number: 4,602,595

[45] Date of Patent: Jul. 29, 1986

[54] OIL SEPARATOR FOR INTERNAL COMBUSTION ENGINE

[75] Inventors: Kongoh Aoki, Kariya; Shuji Okumura, Osaka, both of Japan

[73] Assignee: Aisin Seiki Kabushiki Kaisha, Kariya, Japan

[21] Appl. No.: 705,636

[22] Filed: Feb. 26, 1985

[30] Foreign Application Priority Data

Mar. 1, 1984 [JP] Japan ............................. 59-30447[U]
Mar. 22, 1984 [JP] Japan ............................. 59-41256[U]

[51] Int. Cl.4 ....................... F01M 13/04; B01D 50/00

[52] U.S. Cl. ............................... 123/41.86; 123/90.38; 55/215; 55/385 B; 55/466; 55/482; 55/DIG. 19

[58] Field of Search ...................... 55/215, 385 B, 432, 55/482, 466, 486, 487, 525, 526, DIG. 16, DIG. 19, DIG. 25; 123/41.86, 90.38, 195 C, 572

[56] References Cited

U.S. PATENT DOCUMENTS

| | | | |
|---|---|---|---|
| 2,761,529 | 9/1956 | Wisenbaugh | 55/385 B |
| 2,797,674 | 7/1957 | Dolza | 123/41.86 |
| 3,246,639 | 4/1966 | Oliver | 123/572 |
| 3,978,671 | 9/1976 | Gonzalez | 55/DIG. 25 |
| 4,018,580 | 4/1977 | Burkholz | 55/525 |
| 4,103,650 | 8/1978 | Nishida | 123/41.86 |
| 4,156,406 | 5/1979 | Brandau | 123/41.86 |
| 4,175,937 | 11/1979 | Brandau | 123/41.86 |
| 4,331,460 | 5/1962 | Dillman | 55/DIG. 25 |
| 4,470,389 | 9/1984 | Mitadera | 123/41.86 |
| 4,502,424 | 3/1985 | Katoh | 123/41.86 |

FOREIGN PATENT DOCUMENTS

| | | | |
|---|---|---|---|
| 52-48175 | 4/1977 | Japan | 55/526 |
| 56-149013 | 11/1981 | Japan | 123/41.86 |
| 58-126411 | 7/1983 | Japan | 123/41.86 |
| 1531080 | 11/1978 | United Kingdom | 123/41.86 |

*Primary Examiner*—Ernest G. Therkorn
*Attorney, Agent, or Firm*—Oblon, Fisher, Spivak, McClelland & Maier

[57] ABSTRACT

An oil separator for separating and collecting lubrication oil contained in blow-by gas of an internal combustion engine. The separator is formed in the cylinder-head cover of the engine and incorporates a porous filter or filters made of foam metal for absorbing oil constituents in the blow-by gas. The filter is vertically arranged so as to make the absorbed oil to fall to the bottom of the separator and to be collected by the oil reservoir for recycling the separated oil to the cylinder.

3 Claims, 2 Drawing Figures

OIL SEPARATOR FOR INTERNAL COMBUSTION ENGINE

BACKGROUND OF THE INVENTION

1. Field of the Invention

This invention relates to an oil separator for separating lublication oil from blow-by gas which comes to be produced in an internal combustion engine.

2. Prior Art

In operation of an internal combustion engine, some parts of gas in the combustion chamber leak into the crank case through a gap between the piston and the cylinder during compression and explosion strokes. This "blow-by" gas contains some volume of lublication oil constituents.

There have been proposed many devices for separating this lubrication oil constituents from the blow-by gas. For instance, in the device disclosed in the Bulletin of the Japanese Utility Model Laid-open No. 149013/1981 (Jitsu-kai-sho No. 56-149013), an oil separation case is arranged in a cylinder-head cover; a zig-zag path for the blow-by gas is formed in the case by means of arranging baffle plates; and the oil constituents contained in the gas are separated by the function of the zig-zag path which makes the flow direction of gas to change abruptly. That is to say, while the gas itself can change its flow direction smoothly, oil particles heavier than a certain degree cannot make a sudden change of its flow direction, and consequently, such oil constituents collide against the wall of the zig-zag path and adhere thereto. When the numbers of adhered oil constituents increase, they come to form drops and to fall along the wall by their own weight. The blow-by gas from which the oil constituents are excluded is sent to an intake manifold.

However, in the above way for separation, the fog-like fine oil particles tend to pass through the zig-zag path with the gas. This makes it difficult to separate and collect oil constituents completly from the blow-by gas, and consequently, the lublication oil comes to flow into the intake manifold without being separated completly. It will be apparent that these tendencies bring a drawback that the consumption volume of lubrication oil becomes large and various sensors installed to the manifold are contaminated with oil.

SUMMARY OF THE INVENTION

The object of the present invention is to provide an improved oil separator for an internal combustion engine, which can separate oil constituents from blow-by gas more efficiently.

In accordance with the present invention, a porous filter made of foam metal is arranged vertically in a casing which is formed as a part of the cylinder-head cover. The peripheral portion of the filter, being compressed and having an increased density, is fitted to a groove formed in the casing. The blow-by gas which flows into the casing collides against the porous filter and decreases its flow speed sharply. The oil constituents in the gas adhere to the porous filter in the form of oildrops. Even the fog-like fine oil particles are absorbed by the porous filter. As the filter is arranged vertically, oil constituents adhered to the filter move downward and the upper portion of the filter is maintained as the path for gas. Consequently, the increase of flow resistance is prevented and the blow-by gas from which oil constituents are separated flows toward the intake manifold efficiently.

The capacity of the porous filter to separate oil constituents from the blow-by gas will increase by using a filter with meshes as small as possible. However, a filter with such small meshes tend to be clogged easily. In order to prevent such clogging up of the filter, it is prefered to use a pluralty of filters. That is, a filter of larger meshes is arranged on the upstream-side and a filter of smaller meshes is arranged on the downstream-side. The blow-by gas flowing into the gas-liquid separation chamber firstly collides against the filter of large meshes and oil constituents of larger particles adhere thereto. The blow-by gas passing through the above first filter then collides against the second filter of small meshes and fog-like fine particles are absorbed by this filter. By the above arrangement of filters, the clogging up of the filter is prevented, and moreover, the fine particles of foreign substance contained in blow-by gas too are excluded therefrom.

Incidentally, the peripheral portion of a filter of foam metal generally has a "burr". If such filter haying a burr is used, the burr portion will be worn away by the vibration transmitted from the engine, and the defaced powders will penetrate into the filter. This will cause the filter to be clogged up. Further, such powders will enter the intake manifold and have bad effects on the functions of various sensors equipped to the manifold. In order to avoid these inconveniences, it is preferable to increase the density of the peripheral portion of the filter by compression and fit the peripheral portion having an increased density to a groove formed on the inside wall of the casing. By this treatment, the "burr condition" of the peripheral portion of the filter will disappear and the above inconvenience can be avoided. Further, as the filter is fixed in the groove tightly, the oil, which penetrates into the casing with the blow-by gas and creeps along the inside wall of case, can be separated by the peripheral portion of the filter.

The foregoing and other objects, features and advantages of the present invention will be understood more clearly and fully from the following detailed description of preferred embodiments with reference to the attached drawings.

DETAILED DESCRIPTION OF PREFERED EMBODIMENTS OF THE INVENTION

Figure 1:
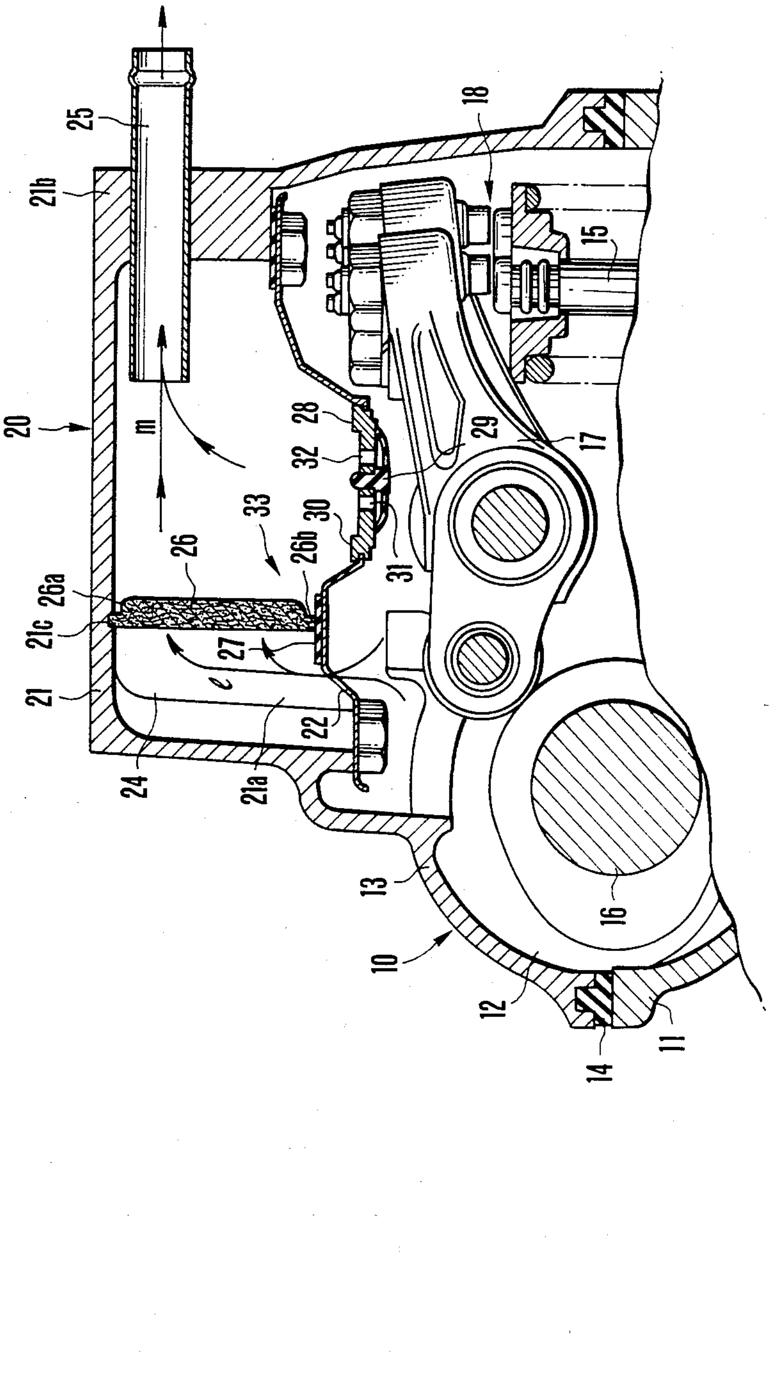
FIG. 1 shows a vertical sectional view of an oil separator embodying the present invention.

Refering to FIG. 1, a cylinder head 11 of an internal combustion engine 10 is covered by a cylinder-head cover 13, thereby forming an upper chamber 12. The cylinder-head cover 13 is fixed to the cylinder head 11, interposing a seal packing 14 between them. In the upper chamber 12, there is arranged a valve-actuating mechanism 18 comprising a cam shaft 16 and a rocker arm 17 for an intake or exhaust valve 15.

An oil separator 20 according to the present invention is constituted with a casing 21 being formed integrally with the cylinder-head cover 13 and having an open lower end 21*a*. At the open lower end 21*a* of the casing 21, there is fixed a baffle member 22 to define a gas-liquid separation chamber 24. When the blow-by gas flows into the gas-liquid separation chamber 24 along the arrow mark "" from inside of the upper chamber 12 of the cylinder head 11, oil drops floating in the blow-by gas are intercepted by the baffle member 22 temporarily. The outlet port 25 for the blow-by gas is formed at the side wall 21*b* of the right side (in the drawing) of the casing 21 and communicates with an intake manifold (not shown) through a communicating means such as a rubber pipe.

In the gas-liquid separation chamber 24, a porous filter 26 made of foam metal having a three dimentional network structure and a porosity generally within the range from 94 to 96% is arranged. The peripheral portion 26*a* of the porous filter 26, which is compressed and has an increased density, is fixed to the groove 21*c* formed on the internal surface of the casing 21. The lower end portion 26*b* of the peripheral portion 26*a* is pressed to the baffle member 22, interposing a seal material 27 between them.

On the lower right side (in the drawing) of the porous filter 26, there is formed an oil reservoir 28 which communicates with the upper chamber of the cylinder head or the crank case through a bevel check valve 29. The oil absorbed to the porous filter 26 is reserved temporarily in the oil reservoir 28. When the volume of oil becomes over a prescribed degree and the check valve is opened by the weight of oil, the oil returns to the crank case through passages 31 and 32 which are formed in a valve holding means 30. The seal meterial 27 maintains sealed condition between the upper chamber 12 and a chamber 33 on the downstream-side of the filter.

As stated above, the filter 26 is made of porous material and has a high efficiency to collect oil particles. The blow-by gas flowing into the gas-liquid separation chamber 24 decreases its flow-speed by colliding with the filter 26, and oil constituents contained in the blow-by gas adhere to the filter in the form of oildrops. Further, as the filter is vertically arranged, the oil-drops adhered to the filter 26 moves downward by its own weight and is reserved temporarily in the oil reservoir 28. The upper portion of the filter 26 is maintained as a path for gas, as the oil captured by this portion is excluded therefrom in accordance with the downward movement of oil. The blow-by gas from which the oil constituents are excluded flows to the outlet port as shown by the arrow mark "m". Incidentally, the oil which creeps the internal wall of the casing 21 is also separated by the peripheral portion 26*a* of the filter, as the pressed peripheral portion 26*a* is fixed tightly to the groove 21*c* of the casing 21.

Figure 2:
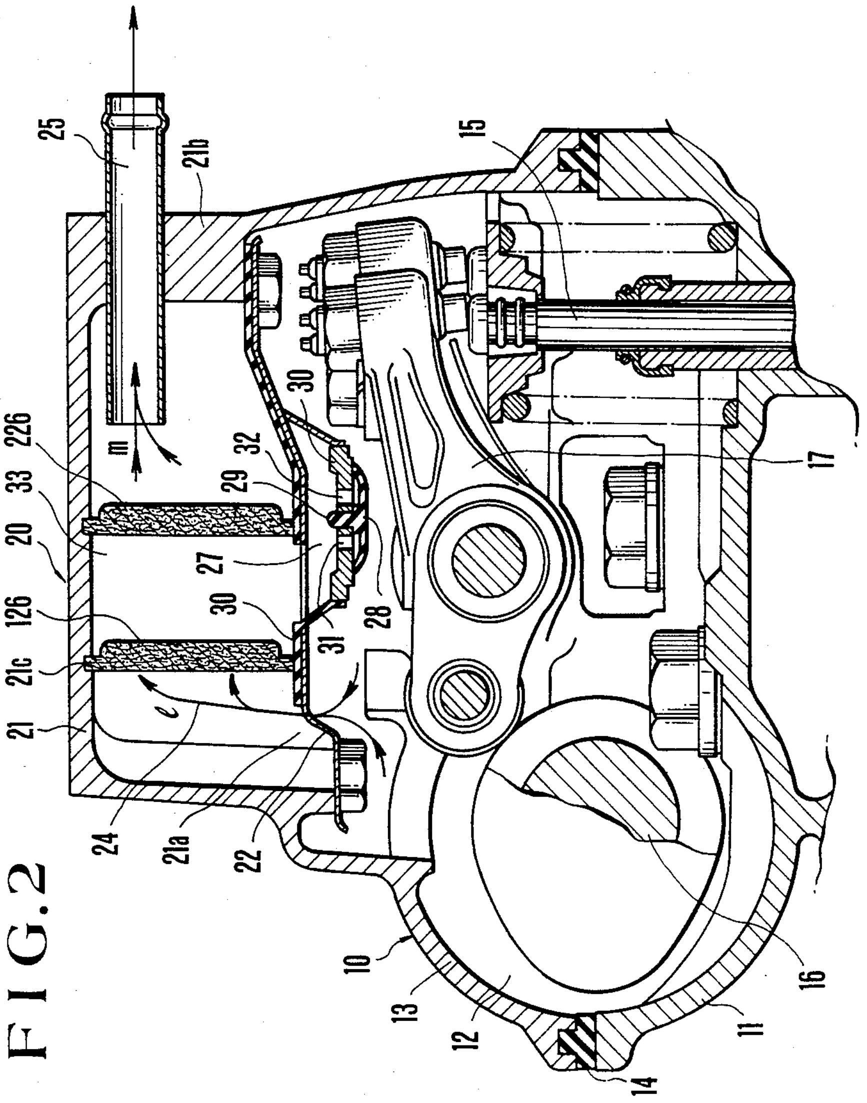
FIG. 2 shows a vertical sectional view of another embodiment of the present invention.

In the embodiment shown by FIG. 2, two porous filters of foam metal are arranged in the gas-liquid separation chamber 24. A filter 126 having larger pores is positioned at the upstream-side and a filter 226 having smaller pores is positioned at the downstream-side. The blow-by gas flowing into the gas-liquid separation chamber 24 firstly collides against the filter 226 and oil constituents of larger particles adhere thereto. The blow-by gas passing through the filter 126 then collides against the filter 226 and fog-like fine oil particles are absorbed by this filter. Thus, the collection of oil constituents is performed more efficiently.

It should be understood that the preferred embodiment of the present invention has been described herein in considerable detail and that certain modifications, changes, and adaptations may be made therein by those skilled in the art and that it is hereby intended to cover all modification, changes and adaptations thereof falling within the scope of the appended claims.

What is claimed is:

1. An oil separator for an internal combustion engine, which comprises:

a casing of oil separator formed integrally with the cylinder-head cover of an engine, a porous filter means made of foam metal arranged vertically in said casing, to absorb oil constituents contained in blow-by gas flowing into said casing from the upper chamber of the cylinder and to pass gas constituents therethrough, an oil reservoir formed at the bottom portion of said casing, to reserve oil separated by said porous filter means, a check valve arranged in said oil reservoir to release the oil from the oil reservoir to the upper chamber of the cylinder when the volume of reserved oil becomes over a predetermined degree, and an outlet port formed in the wall of said casing, to send gas passing through the filter to an intake manifold.

2. An oil separator for an internal combustion engine of claim 1, wherein the peripheral portion of the porous filter of foam metal has an increased density by compression and is fitted to a groove formed on the internal wall of said casing.

3. An oil separator for an internal combusion engine of claim 1, wherein the porous filter means comprises a first porous filter having larger pores and a second porous filter having smaller pores.

* * * * *